Dec. 15, 1936.    P. BOLLINGER    2,063,978
SUPPORT FOR VEHICLE MOTORS
Filed Feb. 23, 1934    2 Sheets—Sheet 1
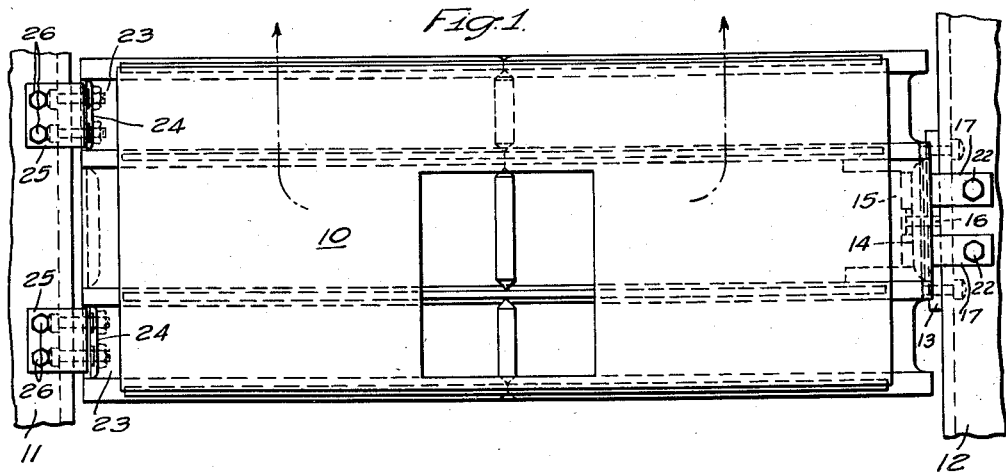
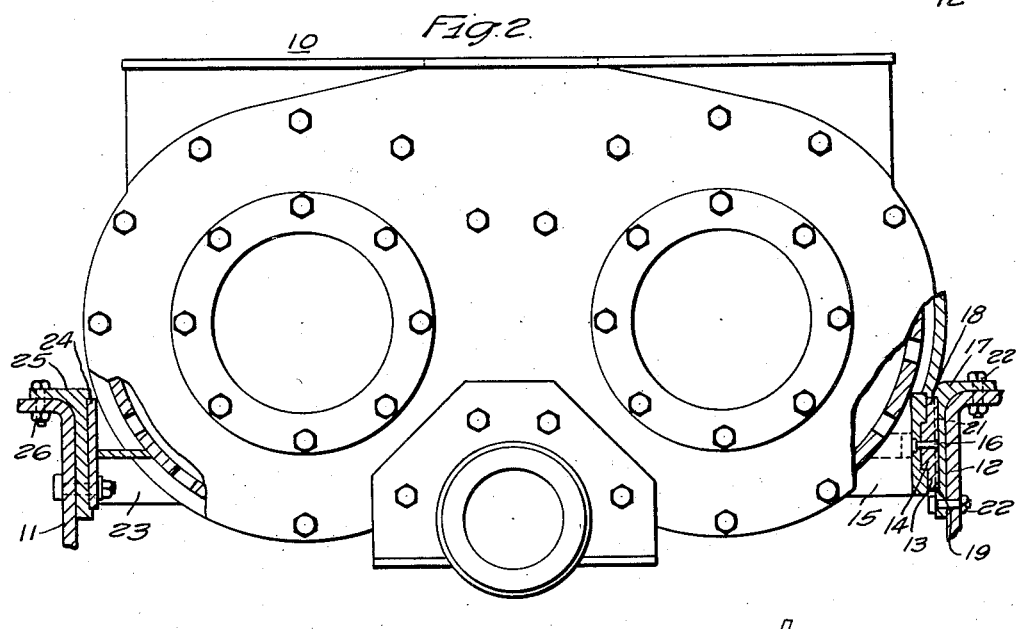
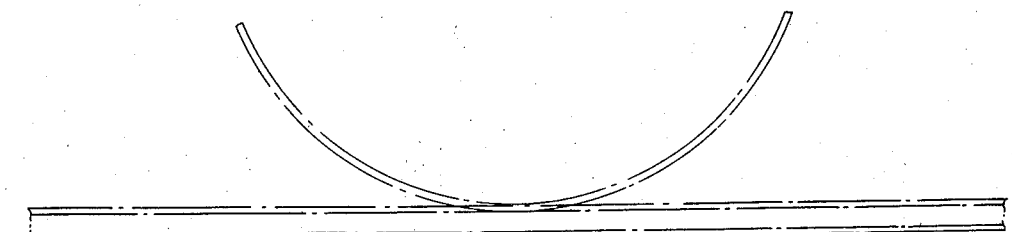
WITNESSES:
INVENTOR
Paul Bollinger.
BY
ATTORNEY Dec. 15, 1936.   P. BOLLINGER   2,063,978
SUPPORT FOR VEHICLE MOTORS
Filed Feb. 23, 1934   2 Sheets-Sheet 2
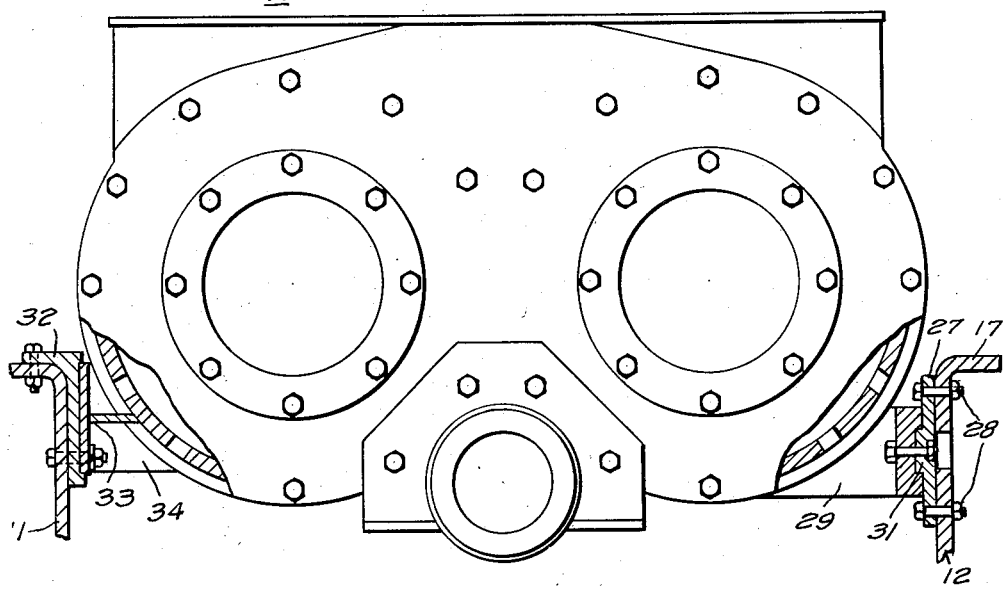
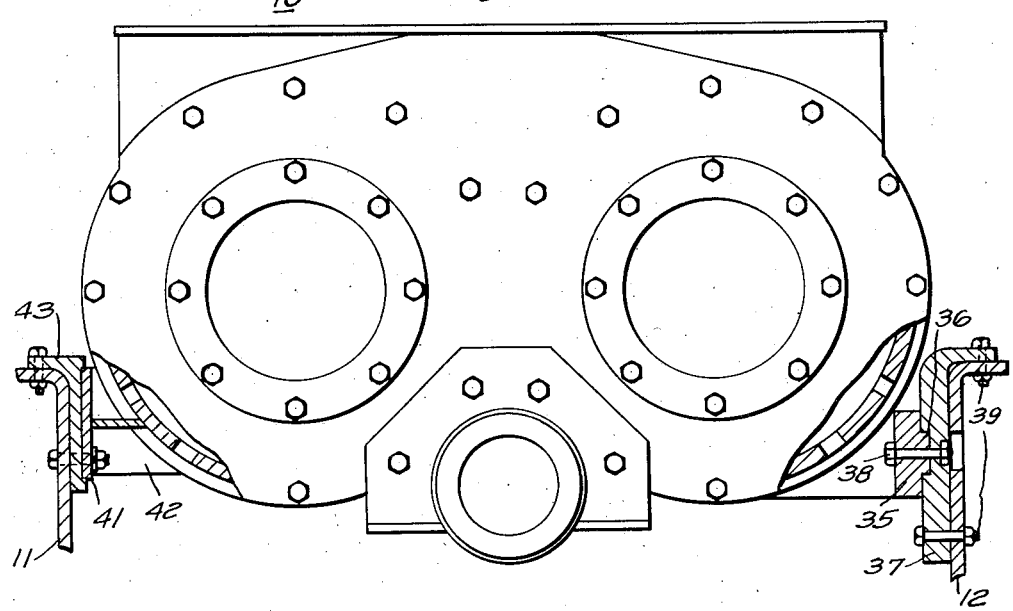
WITNESSES:
INVENTOR
Paul Bollinger.
BY
ATTORNEY Patented Dec. 15, 1936

2,063,978

UNITED STATES PATENT OFFICE 2,063,978

SUPPORT FOR VEHICLE MOTORS

Paul Bollinger, Wilkinsburg, Pa., assignor to Westinghouse Electric & Manufacturing Company, East Pittsburgh, Pa., a corporation of Pennsylvania Application February 23, 1934, Serial No. 712,569

7 Claims. (Cl. 248—6)

This application is a continuation-in-part of my application Serial No. 440,290, filed March 31, 1930, now Patent No. 1,962,122, of June 12, 1934.

The invention relates, generally, to motor mountings, and, more particularly, to supports for vehicle motors having frames of welded construction.

Heretofore, motor frames, and especially railway motor frames, have been constructed largely by casting in the usual manner, thereby providing a strong but massive and heavy frame. Frames of this type may be rigidly mounted in the vehicle supporting frame because of their strength resulting from their massive construction, without too much danger of breakage from twisting strains transmitted from the supporting frame.

However, modern electric locomotives or engines require light weight equipment, which, together with the saving in cost, has brought about the use of light weight welded motor frames. These frames, while rigid and strong in the required manner, cannot be subjected to severe twisting stresses, such as might be caused by a powerful high-speed electric engine. Commonly used methods of mounting the motors or motor frames in the supporting frame of the engine are not suitable or safe for the mounting of light weight welded motor frames for the reason that they do not provide for the elimination of severe twisting stresses.

It is, therefore, the object of my invention to provide an arrangement for mounting a motor frame in a vehicle supporting frame which shall be simple in construction and economical to manufacture, and which shall provide maximum protection to the motor frame against twisting stresses and the like.

A more specific object of my invention is to provide for mounting a motor frame in a vehicle supporting frame in such manner as to not subject the motor frame to twisting stresses resulting from the twisting of the vehicle frame.

A further object of my invention is to provide for supporting a motor frame in a vehicle frame structure in such manner as to permit relative twisting movements between the motor frame and the vehicle frame without damage to the motor frame.

Another object of my invention is to provide a rotational support between one end of a motor frame and the vehicle frame.

A still further object of my invention is to provide a three-point mounting for supporting a motor frame in the vehicle frame which will permit relative movements between the motor frame and the vehicle frame.

Other objects of my invention will become evident from the following description when read in conjunction with the drawings, in which:

Figure 1 is a top plan view of a motor frame showing the three-point supporting arrangement;

Fig. 2 is an elevational view partly in section showing details of the motor mounting at both ends of the motor frame; and Figs. 3 and 4 show modifications of the frame mountings as shown in Fig. 2.

Referring now to Figs. 1 and 2 of the drawings, there is illustrated generally at 10 a motor frame of the twin-motor type which is fully described in my hereinbefore mentioned copending application.

In this instance, the motor frame 10 is mounted in the locomotive between suitable cross ties or transverse cross beams 11 and 12 which constitute a part of the locomotive frame.

In order to provide a mounting for the motor frame 10, or in fact the motor, of such nature that the motor may be easily installed or removed from the locomotive and also one which permits relative movements to occur between the motor frame and the locomotive frame without subjecting the motor frame to twisting strains, there is provided a three-point support whereby the motor frame is more or less rigidly secured to or supported by one of the cross tie members, and rotatably connected to the other cross tie by means of a flexible connection in the form of a trunnion or the like.

In this particular embodiment of the invention, the rotatable or flexible connection comprises a rotatable supporting plate 13 having a centrally-disposed hub portion 14 which nests into a corresponding depression in the face of a suitable supporting foot or pad 15 which is secured in any desired manner to the barrel portion of the motor frame, as shown.

The supporting plate 13 may be removably secured to the pad 15 in any suitable manner as by means of a bolt or rivet 16.

The supporting plate 13 may be attached to the cross tie 12 in a number of different ways, one specific example being shown in Fig. 2 of using a pair of key members 17 having their face portions slotted to receive the supporting plate as shown.

As will be readily understood, the slots in these members, provide top and bottom shoulders 18 and 19 which securely hold the plate 13 against rotational movement or movement in a vertical plane. The plate 17, and consequently, the motor frame may be secured against lateral movement by means of a vertical lug 21 on the plate 17 which fits between the key members 17.

The key members 17 may be positioned between the cross tie 12 and the plate 13 by sliding them along the cross tie into position and may be secured in position by means of bolts 22.

As described hereinbefore, the opposite side of the motor frame is connected to the cross tie 11 in a somewhat rigid manner, and, in this instance, is provided with a pair of supporting pads 23 having upright supporting lugs 24.

It will be readily understood that the supporting lugs 24 may be secured to the cross tie 11 in any suitable manner so long as the attachment provides for the easy removal of the motor frame from the locomotive.

In this particular embodiment of the invention, key members 25, similar to the key member 17, are utilized. As shown, the key members 25 are slotted on their faces to receive the lugs 24, and are locked in position by means of bolts 26. As in the case of key member 17, the key members 25 may be positioned by sliding them along the cross tie until they engage the lug 24, as shown.

It is apparent, however, that the key members 25 may be dispensed with and the lug 24 bolted, or otherwise secured, directly to the cross tie. When the key members, as shown, are used a motor may be readily removed from the locomotive frame by merely sliding the key members 17 and 25 out of engagement and either dropping the motor downwardly or raising it upwardly from its normal position between the cross ties.

In Fig. 3 of the drawings there is shown another way in which the three-point suspension may be provided. In this instance, the supporting plate 27 is secured directly to the cross tie 12 by means of suitable bolts 28 without the use of a key member of any kind.

As in Fig. 2, the supporting foot 29 on the motor frame is provided with a vertical face having a central opening disposed to receive the circular lug 31 on the face of the supporting plate 27.

In this instance, the opposite side of the motor frame is supported by means of key members 32, as described, in connection with Fig. 2, although it is to be understood that the lug 33 of the pad 34 may be secured directly to the cross tie 11. Such an arrangement is easily possible in this embodiment of the invention because of the fact that the supporting plate 27 is secured directly to the cross tie 12, thereby making it possible to drop or raise the motor by merely removing the bolts 28.

In Fig. 4 there is illustrated another embodiment of my invention which also provides for rotatably supporting one end of the motor frame, but which differs from the other two specific embodiments illustrated in that the supporting foot 35 is provided with a centrally disposed lug 36 which nests into a corresponding depression formed in a bracket member 37. In this instance, the bracket member may be secured to the foot 35 by means of the bolt 38. The bracket member 37 is L-shaped in order to directly support the weight without subjecting the locking bolts 39 to undue shearing stress.

The opposite side of the motor frame may be secured to the cross tie 11 in any suitable manner so long as provision is made for permitting a certain amount of sidewise movement of the motor frame toward the cross tie 11 in order to effect the disengagement of the lug 36 from the bracket 37. This is necessary in order to remove the motor by dropping it downwardly, since otherwise the L-shaped bracket member 37 will permit removal only by raising the motor upwardly.

In this instance, the pad 41 of the supporting foot 42 is connected to the cross tie 11 by means of a key member 43 similar to that described in connection with Figs. 2 and 3. It is apparent, however, that the pad 41 need not be supported by a key member of any kind, but may be bolted directly to the cross tie with a shim or spacer therebetween so as to give the necessary clearance when removed for sliding the motor sidewise to release the rotatable coupling at the opposite end.

In view of the foregoing, it is apparent that I have provided for securely supporting a motor within the framework of the vehicle in such manner that, regardless of the amount of twisting action to which the vehicle frame is subjected, no damage can occur to the motor or its frame as a result of such twisting action.

By the use of my invention, the motor frame need not be of such nature as to itself withstand the severe twisting stresses which would otherwise be transmitted thereto by the vehicle frame, but instead may be of light weight welded construction, thus reducing the cost of manufacture and also the weight of the vehicle.

It may be stated in conclusion that while the illustrated examples constitute practical embodiments of my invention, I do not wish to limit myself strictly to the exact details herein illustrated, since modifications of the same may be made without departing from the spirit of the invention as defined by the appended claims.

I claim as my invention:

1. In combination, a supporting frame including spaced cross ties, a motor frame, detachable means for rigidly securing the motor frame to one of said cross ties, said motor frame being provided with a supporting foot having an opening therein, a plate member having a protruding portion adapted to engage the opening in the supporting foot to provide a rotational support, and means for detachably securing the plate member to the other of said cross ties.

2. In combination, a supporting frame having spaced cross ties, a motor frame provided with a plurality of support pads on one side thereof and a single support pad on the other side thereof, a spacing member interposed between each one of said plurality of support pads and one cross tie for detachably securing one side of the motor frame thereto, said single support pad being provided with a protruding portion, a spacing member having an opening therein to receive said protruding portion and interposed between said single support pad and the other of said cross ties, and means for detachably securing said spacing member to the other cross tie, thereby to provide a rotational support for one end of motor frame.

3. In combination, a vehicle frame, a motor to be supported by the vehicle frame, said motor having a frame with a single supporting pad on one side thereof, means for attaching the opposite side of the motor frame to the vehicle frame, said single supporting pad having a flat bearing face, a plate member secured to the face of the pad and co-operating therewith to form a trunnion assembly, and means for attaching the plate member to the vehicle frame.

4. In combination, a supporting frame including spaced supporting members, a motor frame positioned therebetween, said motor frame being rigidly secured to one of said supporting members on one side and provided with a single supporting foot on the opposite side, a spacing member interposed between the supporting foot and the other supporting member, said supporting foot and said spacing member co-operating to form a trunnion support, and means for securing the spacing member to the supporting member.

5. In combination, a supporting frame having spaced members, a motor frame interposed between said spaced members, said motor frame being provided with a plurality of supporting pads on one side thereof and a single centrally located supporting pad on the opposite side thereof, means for rigidly securing said plurality of supporting pads to one spaced member, said single supporting pad being provided with a circular opening, a spacing member disposed between said single supporting pad and the other spaced member, said spacing member having a circular protruding portion disposed to engage the circular opening in the single supporting pad to provide a trunnion support, and means for securing the spacing member to said other spaced member.

6. In combination, a vehicle frame, a motor having a frame for driving the vehicle, means on one side of the motor frame for rigidly supporting the motor from the vehicle frame, a single supporting foot on the opposite side of the motor frame, a plate member adapted to cooperate with the single supporting foot to form a trunnion assembly, and means for securing the plate member to the vehicle frame.

7. In combination, a vehicle frame, a motor for driving the vehicle, said motor having a frame provided with a plurality of supporting pads on one side thereof and a single supporting pad on the opposite side, means for attaching said plurality of pads to the vehicle frame to support one side of the motor, said single supporting pad having a face portion with a recess therein, a plate member having a protruding portion on one side disposed to engage the recess in the face of the pad to provide a trunnion assembly, and means for attaching the plate member to the vehicle frame.

PAUL BOLLINGER.